United States Patent
Li et al.

(10) Patent No.: US 9,723,627 B2
(45) Date of Patent: Aug. 1, 2017

(54) METHOD AND DEVICE FOR TRANSMITTING UPLINK DATA IN SUPPORT OF MULTI-SUBFRAME SCHEDULING

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 304 days.

(21) Appl. No.: 14/189,430

(22) Filed: Feb. 25, 2014

(65) Prior Publication Data

US 2014/0307567 A1 Oct. 16, 2014

(30) Foreign Application Priority Data

Apr. 12, 2013 (CN) .......................... 2013 1 0126251

(51) Int. Cl.
| | |
|---|---|
| H04L 1/18 | (2006.01) |
| H04W 72/14 | (2009.01) |
| H04L 5/14 | (2006.01) |
| H04W 72/12 | (2009.01) |
| H04W 28/18 | (2009.01) |

(52) U.S. Cl.
CPC .......... H04W 72/14 (2013.01); H04L 1/1812 (2013.01); H04L 1/1822 (2013.01); H04L 1/1864 (2013.01); H04L 1/1887 (2013.01); H04L 1/1896 (2013.01); H04L 5/1469 (2013.01); H04W 28/18 (2013.01);
(Continued)

(58) Field of Classification Search
CPC ............. H04W 72/14; H04W 72/1289; H04W 72/1278; H04L 1/1812; H04L 1/1896

USPC ......................................................... 370/252
See application file for complete search history.

(56) References Cited

U.S. PATENT DOCUMENTS 9,504,033 B2 * 11/2016 Seo .................. H04W 72/0446
2011/0122825 A1 5/2011 Lee et al.
(Continued)

FOREIGN PATENT DOCUMENTS

| EP | 2 538 734 | 12/2012 |
|---|---|---|
| WO | WO 2012/128558 | 9/2012 |
| WO | WO 2012/128599 | 9/2012 |

OTHER PUBLICATIONS

HTC, "On HARQ Timing Issues for TDD UL-DL Reconfiguration", R1-130310, 3GPP TSG-RAN WG1 #72, Jan. 18-Feb. 1, 2013.
(Continued)

*Primary Examiner* — Mohammad Anwar
*Assistant Examiner* — Kokou R Detse
(74) *Attorney, Agent, or Firm* — The Farrell Law Firm, P.C.

(57) ABSTRACT

A method for transmitting HARQ for uplink data in support of multi-frame scheduling is provided. The method includes a UE receiving a multi-subframe scheduling uplink grant signaling and PHICH information sent from a base station; for one uplink subframe, the UE processes parameters of uplink transmission according to uplink grant signaling which schedules a SHARQ process of the scheduled uplink subframe and a relative position of a PHICH channel; and the UE sends new uplink data, retransmitting data of the SHARQ to which the uplink subframe belongs, or currently does not send uplink data in the uplink subframe.

20 Claims, 2 Drawing Sheets

(52) U.S. Cl.
CPC ....... *H04W 72/1278* (2013.01); *H04L 1/1861* (2013.01); *H04W 72/1289* (2013.01)

(56) References Cited

U.S. PATENT DOCUMENTS

| | | | |
|---|---|---|---|
| 2011/0211503 A1* | 9/2011 | Che | H04L 5/0005 370/280 |
| 2011/0216676 A1* | 9/2011 | Li | H04W 74/002 370/281 |
| 2013/0016686 A1 | 1/2013 | Li et al. | |
| 2013/0039193 A1* | 2/2013 | Yin | H04W 72/0486 370/252 |
| 2013/0301490 A1* | 11/2013 | He | H04W 76/048 370/280 |
| 2014/0022962 A1 | 1/2014 | Yang et al. | |
| 2014/0078941 A1 | 3/2014 | Seo et al. | |
| 2014/0185539 A1* | 7/2014 | Seo | H04B 7/2656 370/329 |
| 2014/0348091 A1* | 11/2014 | Seo | H04L 5/003 370/329 |

OTHER PUBLICATIONS

CMCC, "Email Discussion Summary on Inter-band CA for Supporting Different TDD UL-DL Configuration", R1-120873, 3GPP TSG RAN WG1 Meeting #68, Feb. 6-10, 2012.
New Postcom, "Evaluation Assumptions for Enhancement for UE-specific RS and Control Signaling", R1-130186, 3GPP TSG RAN WG1 Meeting #72, Jan. 28-Feb. 1, 2013.
European Search Report dated Nov. 15, 2016 issued in counterpart application No. 14783187.9-1851, 10 pages.

\* cited by examiner

METHOD AND DEVICE FOR TRANSMITTING UPLINK DATA IN SUPPORT OF MULTI-SUBFRAME SCHEDULING

PRIORITY

This application claims priority under 35 U.S.C. §119(a) to Chinese Patent Application No. 201310126251.X which was filed in the State Intellectual Property Office of the People's Republic of China on Apr. 12, 2013, the entire content of which is incorporated herein by reference.

BACKGROUND OF THE INVENTION

1. Field of the Invention

The present invention generally relates to wireless communication system, and more particularly, to a method and device for processing Hybrid Automatic Repeat reQuest (HARD) transmission for uplink data in a system supporting multi-subframe scheduling.

2. Description of the Related Art

A Long Term Evolution (LTE) system of the 3$^{rd}$ Generation Partnership Project (3GPP) standardization organization may support two duplex modes, that is, Frequency-Division Duplexing (FDD) and Time-Division Duplexing (TDD).

FIG. 1 is a schematic diagram of subframes.

As shown in FIG. 1, for an FDD system, each radio frame has a length of 10 ms, consisting of 10 subframes each having a length of 1 ms. Each radio frame consists two consecutive time slots, the length of which is 0.5 ms. That is, a k$^{th}$ subframe includes time slots 2k$^{th}$ and (2k+1)$^{th}$. For a TDD system, each radio frame is equally divided into two half-frames, each 5 ms long. Each half-frame includes 8 time slots with a length of 0.5 ms and 3 special fields, i.e., Downlink Pilot Time Slot (DwPTS), Guard Period (GP) and Uplink Pilot Time Slot (UpPTS). A total length of the three special fields is 1 ms long. Each sub-frame consists of two continuous time slots, i.e., the kth subframe includes time slots 2k$^{th}$ and (2k+1)$^{th}$. One downlink transmission time interval (TTI) is defined in a subframe.

The TDD system supports 7 different LTE uplink-downlink configurations, as shown in Table 1. In Table 1, D represents a downlink subframe, U represents an uplink sub-frame, and S represents the above special subframe consisting of 3 special fields.

TABLE 1

LTE TDD uplink-downlink configurations

| configuration number | switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

The front n Orthogonal Frequency Division Multiplex (OFDM) symbols of each subframe can be used to transmit downlink control information including a Physical Downlink Control CHannel (PDCCH), a Physical HARQ Indicator CHannel (PHICH) and other control information, where n is equal to 1, 2 or 3; the remaining OFDM symbols can be used to transmit Physical Downlink Shared CHannel (PDSCH) or Enhanced PDCCH (ePDCCH). The resource allocation granularity is a Physical Resource Block (PRB). One PRB contains 12 consecutive subcarriers in frequency and corresponds to a time slot in time. In one subframe, two PRBs respectively located in two slots of the subframe while occupying same subcarriers are referred to as a PRB pair. In each PRB pair, each Resource Element (RE) is the smallest unit of time-frequency resources, i.e., a subcarrier in frequency and an OFDM symbol in time.

In the LTE system, the PDCCH carries Downlink Control Information (DCI) allocating uplink channel resource and downlink channel resource, which can be referred as downlink grant signaling and uplink grant signaling, respectively. Grant signaling of different UEs is independently sent, and Downlink grant signaling and uplink grant signaling are independently sent, respectively. Except for uplink data transmission in TDD UL-DL configuration 0, grant signaling in each downlink subframe schedules downlink or uplink transmission of only one subframe. For uplink data transmission in TDD UL-DL configuration 0, since a number of uplink subframes is greater than that of downlink subframes, thus, using one downlink subframe to simultaneously schedule uplink data transmission of at most two uplink subframes can be supported.

In the existing LTE system, for an uplink grant signaling detected in a downlink subframe n, the uplink grant signaling schedules uplink data transmission in uplink subframe n+k. For the FDD system, a value of k is always 4. For a TDD system, a value of k is dependent on TDD UL-DL configurations, as shown in Table 2. For TDD UL-DL configuration 0, scheduling two subframes simultaneously or only one of the subframes can be further distinguished according to an uplink index of DCI.

TABLE 2

Values of k corresponding to different TDD UL-DL configurations

| configuration number | downlink subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | | | | 4, 7 | 6, 7 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

In the existing LTE system, uplink data transmission is based on synchronous HARQ. Uplink data retransmission can be triggered based on the PHICH. For PHICH information received in downlink subframe n, the PHICH carries HARQ-ACK information for uplink data transmission in uplink subframe n-k. For the FDD system, a value of k is always 4. For the TDD system, a value of k is dependent on TDD UL-DL configurations, as shown in Table 3. For TDD UL-DL configuration 0, two PHICH resource sets are configured in downlink subframes 0 and 5, respectively, and can trigger uplink data transmissions in different uplink subframes.

TABLE 3

Values of k between Physical Uplink Shared Control CHannel (PUSCH) timing and PHICH timing corresponding to different TDD UL-DL configurations

| configuration number | downlink subframe index n | | | | | | | | | |
|---|---|---|---|---|---|---|---|---|---|---|
| | 0 | 1 | 2 | 3 | 4 | 5 | 6 | 7 | 8 | 9 |
| 0 | 6, 7 | 4 | | | | 6, 7 | 4 | | | |
| 1 | | 4 | | | 6 | | | 4 | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

Further, for PHICH information received in downlink subframe n, the PHICH schedules uplink data transmission in uplink subframe n+k. For the FDD system, a value of k is always 4. For the TDD system, a value of k is dependent on TDD UL-DL configurations, as shown in Table 4. For TDD UL-DL configuration 0, two PHICH resource sets are configured in downlink subframes 0 and 5, respectively, and can trigger uplink data transmissions in different uplink subframes.

TABLE 4

Values of k between PHICH timing and retransmission timing corresponding to different TDD UL-DL configurations

| configuration number | downlink subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | | | | 4, 7 | 7 | | | |
| 1 | | 6 | | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

In the follow-up research on LTE, a multi-subframe scheduling technique has attracted more and more attention. As shown in FIG. 1, for uplink multi-subframe scheduling, an uplink grant signaling of one downlink subframe can schedule uplink data transmission of one or more uplink subframes. Through the multi-subframe scheduling technique, resource overhead of scheduling indicators can be saved. Further, if some special subframe cannot send an uplink scheduling command due to not having enough resources, this will result in an uplink subframe corresponding to the downlink subframe that cannot be scheduled; through the multi-subframe scheduling technique, this problem can also be solved. As a special case, a grant signaling of the multi-subframe scheduling may actually schedule uplink data transmission of only one uplink subframe, and the timing relationship is different from that of the existing LTE system.

In fact, in the existing version of LTE, TDD UL-DL configuration 0 already supports the technique of simultaneously scheduling at most two uplink subframes. However, for the FDD system and TDD UL-DL configurations 1~6, multi-subframe scheduling is not supported. Thus, if the multi-subframe scheduling technique is used, how to perform an effective synchronous HARQ transmission for uplink data transmission is a problem that needs to be solved.

SUMMARY OF THE INVENTION

The present invention has been made to address at least the above problems and disadvantages, and to provide at least the advantages described below. Accordingly, an aspect of the present invention provides a method for transmitting HARQ for uplink data in support of multi-subframe scheduling, which supports a multi-subframe uplink scheduling technique and performs an effective synchronous HARQ control for uplink data transmission.

According to an aspect of the present invention, a method for transmitting Hybrid Automatic Repeat reQuest (HARQ) for uplink data in support of multi-frame scheduling in a User Equipment (UE) is provided. The method includes receiving a multi-subframe scheduling uplink grant signaling and Physical HARQ Indicator CHannel (PHICH) information sent from a base station; determining timing positions of a scheduled uplink subframe and a subsequent transmission of a corresponding Synchronous HARQ (SHARQ) process of the scheduled uplink subframe, according to a timing relationship between the multi-subframe scheduling uplink grant signaling and the scheduled uplink subframe; and for a scheduled uplink subframe, determining parameters of uplink transmission according to uplink grant signaling which schedules a SHARQ process of the scheduled uplink subframe and a relative position of a PHICH channel, and performing data transmission or stopping current transmission in the uplink subframe according to the parameters of uplink transmission.

According to another aspect of the present invention, a UE device for transmitting HARQ for uplink data in support of multi-subframe scheduling is provided. The UE device includes a data receiving unit, a processing unit and a data sending unit; wherein the data receiving unit is configured to receive a multi-subframe scheduling uplink grant signaling and PHICH information sent from a base station; the processing unit is configured to, according to a timing relationship between the multi-subframe scheduling uplink grant signaling and a scheduled uplink subframe, determine timing positions of the scheduled uplink subframe and a subsequent transmission of a SHARQ process corresponding to the scheduled uplink subframe; and for the scheduled uplink subframe, the UE determines parameters of uplink transmission according to the uplink grant signaling which schedules the SHARQ process of the scheduled uplink subframe and a relative position of a PHICH channel; the data sending unit is configured to perform data transmission or stop a current transmission in the uplink subframe according to the parameters of uplink transmission.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
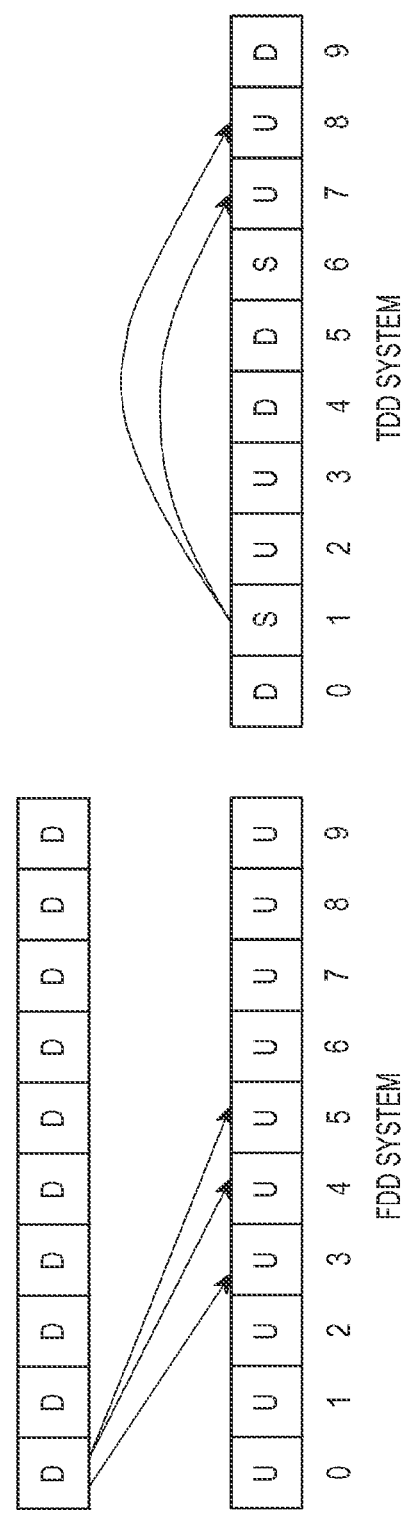
FIG. 1 is a schematic diagram of subframes.

The present invention will be described in further detail hereinafter with reference to accompanying drawings.

In the existing LTE system, uplink data transmission is based on a synchronous HARQ (SHARQ) mechanism. That is, after scheduling PUSCH transmission of one SHARQ process, both of PHICH timing position and retransmission timing position corresponding to this SHARQ process are predetermined.

The basic idea of processing multi-subframe uplink scheduling according to the present invention includes: newly defining a timing relationship from multi-subframe scheduling uplink grant signaling to PUSCH in multiple uplink subframes; and determining a timing position of a subsequent uplink transmission of one SHARQ process by using the same method as that of UE which does not support multi-subframe scheduling before LTE version 11; that is to say, the timing relationship between an initial uplink transmission and retransmission is the same as that of the existing UE which does not support multi-subframe scheduling.

In order to reduce complexity, for a multi-subframe scheduling uplink grant signaling of a downlink subframe n, assuming that the multi-subframe scheduling uplink grant signaling can schedule uplink data transmissions of M uplink subframes, based on a timing relationship from uplink grant signaling to PUSCH of one uplink subframe of the existing single-subframe scheduling, one or two uplink subframes capable of being scheduled by the downlink subframe n in the existing LTE system can be contained in a subset of the above M uplink subframes. The above timing relationship from uplink grant signaling to PUSCH of one uplink subframe of the single-subframe scheduling can be determined according to TDD UL-DL configurations transmitted in System Information Block 1 (SIB1); and can also be determined by using a reference UL-DL configuration configured by high-layer signaling. Here, the reference UL-DL configuration can reuse one of the 7 kinds of existing TDD UL-DL configurations.

When determining a timing relationship (i.e., timing between an initial uplink transmission and retransmission) of a subsequent uplink transmission according to an existing method of the LTE system, the timing relationship can also be determined according to one TDD UL-DL configuration. For example, a timing of a subsequent PUSCH transmission of one SHARQ process can be determined according to a TDD UL-DL configuration transmitted in SIB1; or, one of the 7 kinds of existing TDD UL-DL configurations can be configured by high-layer signaling as a reference UL-DL configuration, and the timing of a subsequent PUSCH transmission of one SHARQ process can be determined based on this reference UL-DL configuration. The reference UL-DL configuration can be the same as or different from a UL-DL configuration that a UE which does not support multi-subframe scheduling works in. Generally, the reference UL-DL configuration for determining the timing relationship from multi-subframe scheduling uplink grant signaling to the PUSCH, and the reference UL-DL configuration for determining the timing relationship between the PUSCH initial transmission and retransmission can be the same TDD UL-DL configuration. Adopting the method of the present invention, when a new UE supporting multi-subframe scheduling and an existing UE not supporting multi-subframe scheduling simultaneously exist in a cell and they adopt the same timing relationship to determine a timing position of a subsequent uplink transmission of one SHARQ process, then the number of uplink SHARQ processes remains unchanged, which also reduces the complexity of a scheduler.

For multi-subframe uplink scheduling, similar to determining a timing position of a subsequent uplink transmission of one SHARQ process, both of a PHICH timing relationship of one PUSCH transmission of one SHARQ process and a timing relationship of PUSCH retransmission triggered by the PHICH can be determined by using the same method as that of an existing UE which does not support multi-subframe scheduling. In this way, when a new UE supporting multi-subframe scheduling and an existing UE not supporting multi-subframe scheduling simultaneously exist in a cell and they adopt the same PHICH timing relationship of PUSCH transmission and the timing relationship of PUSCH retransmission triggered by the PHICH, the complexity of a scheduler can be further reduced. When specifically determining the PHICH timing of PUSCH transmission and the timing relationship of PUSCH retransmission triggered by the PHICH, it can be performed according to one TDD UL-DL configuration. For example, the PHICH timing relationship of PUSCH transmission and the timing relationship of PUSCH retransmission triggered by the PHICH can be determined based on a TDD UL-DL configuration transmitted in SIB1. Also, the PHICH timing relationship of PUSCH transmission and the timing relationship of PUSCH retransmission triggered by the PHICH can be determined by using the aforementioned reference UL-DL configuration. Also, the new PHICH timing relationship of PUSCH transmission and the new timing relationship of PUSCH retransmission triggered by the PHICH can be defined; however, the new definition of PHICH does not change the timing of subsequent uplink transmission of one SHARQ process, i.e., the timing relationship between initial PUSCH transmission and retransmission remains unchanged.

Figure 2:
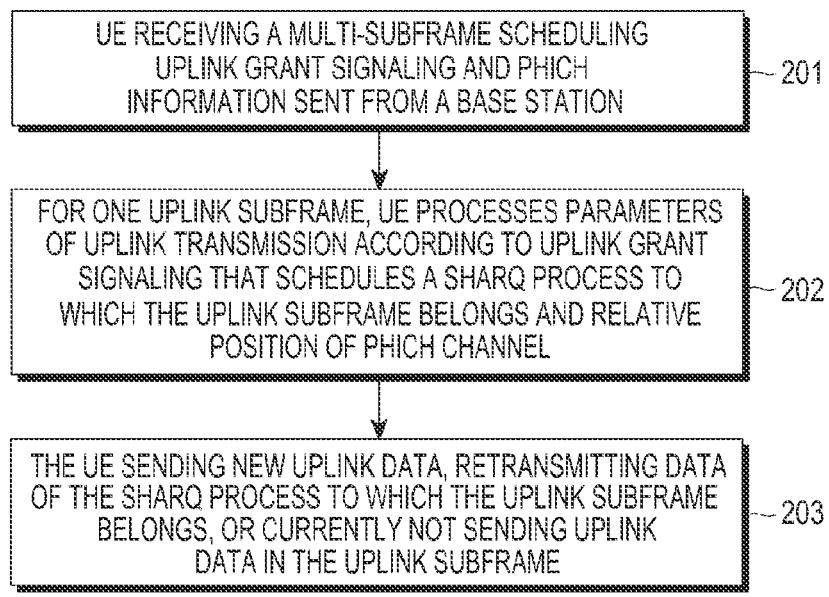
FIG. 2 is a flowchart of a method according to an embodiment of the present invention.

A flow-chart of a method of the present invention is hereinafter described with reference FIG. 2. As shown in FIG. 2, the method includes, in step 201 the UE receiving a multi-subframe scheduling uplink grant signaling and PHICH information sent from a base station.

In step 201, due to use of multi-subframe scheduling uplink grant signaling, PUSCH transmissions of multiple uplink subframes can be scheduled by one downlink subframe. While the PHICH channel generally only sends PHICH information of one SHARQ process in one downlink subframe, when supporting multi-subframe scheduling, the multi-subframe scheduling uplink grant signaling and the PHICH channel generally can be sent in different downlink subframes.

A multi-subframe scheduling uplink grant signaling can schedule uplink transmissions of at most M uplink subframes at a time, and M is greater than or equal to 2. For example, M bits can be used to indicate a scheduling state of each uplink subframe one by one.

In a first method for defining multi-subframe scheduling, each multi-subframe scheduling uplink grant signaling at most supports simultaneously scheduling uplink data transmission of two uplink subframes. In this way, there may be no need to modify TDD UL-DL configuration 0, and it is only needed to define new multi-subframe scheduling for FDD and TDD UL-DL configurations 1~6. Here, it can be a method of reusing TDD UL-DL configuration 0 which uses a 2-bit uplink index field to indicate an actual scheduled uplink subframe.

Further, if considering TDD UL-DL configuration 0 and considering that uplink grant signaling cannot be sent in the DwPTS, in order to be able to schedule all uplink subframes, then in a second method for defining multi-subframe scheduling, at least one multi-subframe scheduling uplink grant signaling supports scheduling 3 uplink subframes. One possible scenario in which uplink grant signaling cannot be sent in DwPTS is: in the new carrier type (NCT) discussed in the LTE version 12, if a length of DwPTS is 3 OFDM symbols, then the existing LTE version does not define available DeModulation Reference Signal (DMRS) structure, and thus uplink grant signaling cannot be sent.

TABLE 5

Values of k of general multi-subframe scheduling

| configuration | downlink subframe index n | | | | | | | | | |
|---|---|---|---|---|---|---|---|---|---|---|
| number | 0 | 1 | 2 | 3 | 4 | 5 | 6 | 7 | 8 | 9 |
| 0 | 4, 7, 8 | 6, 7, 8 | | | | 4, 7, 8 | 6, 7, 8 | | | |

TABLE 6

Values of k of general multi-subframe scheduling

| | downlink subframe index n | | | | | | | | | |
|---|---|---|---|---|---|---|---|---|---|---|
| configuration number | 0 | 1 | 2 | 3 | 4 | 5 | 6 | 7 | 8 | 9 |
| 0 | 4, 7, 8 | 6, 7, 8 | | 4, 5, 6 | 4, 5, 8 | 4, 7, 8 | 6, 7, 8 | 5, 6, 7 | 4, 5, 6 | 4, 5, 8 |

For the FDD system, since the uplink subframes are consecutive, it can be defined that what is scheduled by a multi-subframe scheduling uplink grant signaling carried in downlink subframe n is M consecutive uplink subframes, and a first uplink subframe can be n+k, where for example, k is equal to 4.

For the TDD system, for a downlink subframe n, assuming that the downlink subframe n can schedule uplink data transmissions of M uplink subframes, one or two uplink subframes capable of being scheduled by the downlink subframe n in the existing LTE system can be contained in a subset of the above M uplink subframes.

In the TDD system, when defining a timing relationship from multi-subframe scheduling uplink grant signaling to a scheduled uplink subframe, one method is not dependent on an actual TDD UL-DL configuration, and defines a general timing relationship from multi-subframe scheduling uplink grant signaling to an uplink subframe scheduled by the multi-subframe scheduling uplink grant signaling. Specifically, when defining this general timing relationship, it can be defined that multi-subframe scheduling uplink grant signaling can be sent only in specific downlink subframes. For example, based on TDD UL-DL configuration 0, assuming that M is equal to 3 and only the downlink subframe n (where n is equal to 0, 1, 5 or 6) is configured with multi-subframe scheduling uplink grant signaling, then uplink subframe index n+k scheduled by the multi-subframe scheduling uplink grant signaling can be defined according to Table 5, and k represents a subframe difference between uplink grant signaling and a scheduled uplink subframe. Also, when defining the general timing relationship, it can be defined that multi-subframe scheduling uplink grant signaling can be sent in all downlink subframes. For example, based on TDD UL-DL configuration 0, still assuming that M is equal to 3, then uplink subframe index n+k scheduled by the multi-subframe scheduling uplink grant signaling can be defined according to Table 6.

Under the above general timing relationship between uplink grant signaling and a scheduled uplink subframe, when some subframe is an uplink subframe in an actual UL-DL configuration, then this subframe cannot transmit multi-subframe scheduling uplink grant signaling.

For example, in Table 5 and Table 6, when an actual configuration is not configuration 0, some subframe n+k may actually be a downlink subframe and thus cannot be used for uplink data transmission. In this case, a number of bits for indicating a scheduled uplink subframe in multi-subframe scheduling uplink grant signaling may remain unchanged so as to be consistent with the configuration 0. Also, in order to reduce the number of bits occupied by the uplink grant signaling, the above subframe n+k which actually is a downlink subframe may not be indicated, and thus the number of bits for indicating the scheduled uplink subframe can be set according to a maximum number of uplink subframes which can be actually scheduled by each TDD UL-DL configuration. Therefore, the numbers of bits for indicating a scheduled uplink subframe in different TDD UL-DL configurations can be different. Also, in order to further reduce the number of bits occupied by the uplink grant signaling, for each TDD UL-DL configuration, a maximum number of uplink subframes actually scheduled by each downlink subframe which sends multi-subframe scheduling uplink grant signaling can further be distinguished, and the number of bits for indicating the scheduled uplink subframe can be set accordingly. If there is no padding bit, this will cause that for the same TDD UL-DL configuration, the numbers of bits of multi-subframe scheduling uplink grant signaling in different downlink subframes can be different.

For the TDD system, when defining the timing relationship from multi-subframe scheduling uplink grant signaling to a scheduled uplink subframe, in another method each TDD UL-DL configuration is respectively configured with a timing relationship from multi-subframe scheduling uplink grant signaling to an uplink subframe scheduled by the multi-subframe scheduling uplink grant signaling, and schedules actually existing M uplink subframes. Here, sizes of windows M which can be supported by different TDD UL-DL configurations can be different. For example, TDD UL-DL configuration 2 has only two SHARQ processes, then, if the window M is equal to 3, this will result in two subsequent transmissions simultaneously scheduling the same SHARQ process. Thus, for TDD UL-DL configuration 2, M can be configured to be not more than 2. Also, if allowing multiple transmissions scheduling the same SHARQ process in one multi-subframe scheduling uplink grant signaling, then the windows M of the variety of different TDD UL-DL configurations can be equal. Here, the UE can directly retransmit a same uplink data in more than a second transmission timing scheduled for the same SHARQ process, or can also determine whether an uplink data packet is successful according to feedback PHICH information from a subsequent base station, and then determine whether it is necessary to retransmit or send new data.

Specifically, for each TDD UL-DL configuration, multi-subframe scheduling uplink grant signaling can also be configured only in a downlink subframe which can send uplink grant signaling in the LTE version 8. Also, for each TDD UL-DL configuration, multi-subframe scheduling uplink grant signaling can be configured in all downlink subframes.

For example, taking the configuration of multi-subframe scheduling uplink grant signaling only in a downlink subframe which can send uplink grant signaling in the LTE version 8 as an example, keeping windows M of the variety of TDD UL-DL configurations equal, and assuming that M is equal to 3, then uplink subframe index n+k scheduled by the multi-subframe scheduling uplink grant signaling can be defined according to Table 7, where k represents a subframe difference between uplink grant signaling and a scheduled uplink subframe.

subframe in which the PHICH channel of the SHARQ process exists or a timing of a subsequent subframe (that is the same as the situation of the existing single-frame scheduling), since a timing of the PHICH channel in relation to a previous PHICH transmission of this SHARQ process must meet a timing relationship in which a base station decodes uplink data, the base station already knows whether a previous uplink transmission of this SHARQ process is successful or has failed when the base station sends uplink grant signaling and the PHICH, thus the UE can obtain parameters of transmitting uplink data in the uplink subframe according to the above uplink grant signaling for this SHARQ process.

2) When the uplink grant signaling which schedules the SHARQ process is detected in a timing of a subframe before the timing of the downlink subframe in which the PHICH channel of the SHARQ process exists, there can be three kinds of processing methods, as will be described below.

In a first processing method, the UE deems that the base station has completed decoding of the previous data transmission of the SHARQ process before the base station sends the uplink grant signaling and then knows whether the previous uplink transmission is successful or has failed, thus

TABLE 7

Values of k of multi-subframe scheduling

| configuration number | downlink subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7, 8 | 6, 7, 8 | | | | 4, 7, 8 | 6, 7, 8 | | | |
| 1 | | 6, 7, 11 | | | 4, 8, 9 | | 6, 7, 11 | | | 4, 8, 9 |
| 2 | | | | 4, 9, 14 | | | | | 4, 9, 14 | |
| 3 | 4, 12, 13 | | | | | | | | 4, 5, 6 | 4, 5, 13 |
| 4 | | | | | | | | | 4, 5, 14 | 4, 13, 14 |
| 5 | | | | | | | | | 4, 14, 24 | |
| 6 | 7, 8, 12 | 7, 11, 12 | | | | 7, 8, 9 | 7, 8, 11 | | | 5, 8, 9 |

Referring back to FIG. 2, in step 202, for one uplink subframe, UE processes parameters of uplink transmissions according to uplink grant signaling that schedules the SHARQ processes to which the uplink subframes belong and relative positions of PHICH channels.

In the existing single-subframe scheduling, a subframe in which an uplink grant signaling configured to schedule a SHARQ process exists is the same as a subframe in which a PHICH exists, or is behind the subframe in which the PHICH exists. Thus, for PUSCH transmission which uses uplink grant signaling for scheduling of a SHARQ process, the UE only needs to perform transmission according to instructions of the uplink grant signaling.

In the method of the present invention, since one downlink subframe schedules multiple uplink PUSCHs, a situation that a subframe in which an uplink grant signaling configured to schedule a SHARQ process exists is before the subframe in which PHICH exists may occur. For this situation, it is necessary to consider how to perform uplink transmissions indicated by this uplink grant signaling. Based on the above consideration, in the present invention, for one uplink subframe, the UE processes parameters of subsequent uplink transmissions according to the uplink grant signaling which schedules the SHARQ process of the uplink subframe and relative position of PHICH channel. Specific processing can be divided into following situations:

1) When an uplink grant signaling which schedules one SHARQ process is detected in a timing of a downlink the UE can obtain parameters of transmitting uplink data in the uplink subframe directly according to the uplink grant signaling. That is to say, in this situation, if receiving uplink grant signaling configured to schedule one SHARQ process is received, then subsequently received PHICH information of the same SHARQ process will no longer be processed.

In a second processing method, the UE deems that the base station cannot complete decoding of the previous data transmission of the SHARQ process before the base station sends the uplink grant signaling and then does not know whether the previous uplink transmission is successful or has failed. Thus, the UE needs to further receive PHICH information, determine whether the previous uplink transmission is successful or has failed according to the PHICH information and determine resource configuration of a corresponding uplink subframe according to the uplink grant signaling. This process includes three alternative manners A, B and C.

In the manner A: determining whether the previous uplink transmission is successful or has failed according to PHICH information, determining parameters of transmitting uplink data in the uplink subframe according to the uplink grant signaling, and performing adaptive retransmission of the uplink data.

For example, if the PHICH indicates an ACK, then the UE can report the ACK to a higher layer and stops uplink transmission; if the PHICH indicates a NACK, then the UE can report the NACK to the higher layer, and retransmit uplink data of this SHARQ process under the precondition of not exceeding a maximum retransmission time. Here, the UE can obtain parameters, such as allocated PRB resources and a modulation scheme, etc., of transmitting uplink data in the uplink subframe according to the uplink grant signaling for this SHARQ process, so as to perform adaptive retransmission of the uplink data.

In the manner A, the manner of processing of the SHARQ process is irrelevant with a New Data Indicator (NDI) of the uplink grant signaling. The base station can set that the NDI value of the uplink grant signaling has not changed relative to the NDI value of a previous uplink grant signaling. Or, the NDI of the uplink grant signaling can be directly ignored in uplink HARQ operations of the base station and UE. The present invention does not limit the ways of processing for a New Data Indicator (NDI) of the above uplink grant signaling.

In the manner B: determining whether the previous uplink transmission is successful or has failed according to the PHICH information, determining parameters of transmitting uplink data in the uplink subframe according to the uplink grant signaling, and performing adaptive transmission or retransmission of uplink new data.

For example, if the PHICH indicates an ACK, then the UE can send new uplink data in this SHARQ process; if the PHICH indicates a NACK, then the UE can report the NACK to the higher layer, and retransmit uplink data of this SHARQ process under the precondition of not exceeding a maximum retransmission time. Here, the UE can obtain parameters, such as allocated PRB resources and a modulation scheme, etc., of transmitting uplink data in the uplink subframe according to the uplink grant signaling for this SHARQ process, so as to transmit uplink new data or perform adaptive retransmission of the uplink data.

In the manner B, the manner of processing of the SHARQ process is irrelevant with the NDI of the uplink grant signaling. The present invention does not limit the ways of processing for the NDI of the above uplink grant signaling. For example, the NDI of the uplink grant signaling can be directly ignored in uplink HARQ operations of the base station and UE.

In the manner C: according to PHICH information and the NDI of uplink grant signaling, the operation method for one SHARQ process is jointly indicated. For example, if the PHICH indicates an ACK, and the NDI of the uplink grant signaling is changed, then the UE can send new uplink data in this SHARQ process; if the PHICH indicates the ACK, and the NDI of the uplink grant signaling is not changed, then the UE can report the ACK to a higher layer and stops uplink transmission; if the PHICH indicates a NACK, and the NDI of the uplink grant signaling is not changed, then the UE can report the NACK to the higher layer, and retransmit uplink data of this SHARQ process under the precondition of not exceeding a maximum retransmission time. Here, in the situation where the base station does not know whether the previous uplink transmission of this SHARQ process is successful or has failed, the base station still modifies the NDI of the uplink grant signaling, which can be used as a kind of indication information. For example, the base station predicts that the previous uplink transmission of this SHARQ process must be successful or is successful with great probability, and the PHICH is very reliable, thus, by modifying the NDI value of the uplink grant signaling, the UE can be indicated to send new data according to an ACK indicated by the PHICH. In a situation where the base station is not sure that the previous uplink transmission of this SHARQ process is successful and PHICH transmission has a poor reliability, the base station can set that the NDI of the uplink grant signaling is not changed, so as to prohibit the UE from sending new data according to the ACK indicated by the PHICH and to trigger the UE to perform retransmission of the uplink data of this SHARQ process by sending a PHICH NACK.

For a situation in which the PHICH indicates the NACK but the NDI of the uplink grant signaling is changed, the UE can deem this is an illegal situation; or, the UE can report the NACK to the higher layer, and retransmit uplink data of this SHARQ process under the precondition of not exceeding a maximum retransmission time. The present invention does not limit the ways of processing for the NDI of the above uplink grant signaling. For example, the NDI of the uplink grant signaling can be directly ignored in uplink HARQ operations of the base station and UE.

Here, the UE can obtain parameters, such as allocated PRB resources and a modulation scheme, etc., of transmitting uplink data in the uplink subframe according to the uplink grant signaling for this SHARQ process, so as to transmit uplink new data or perform adaptive retransmission of the uplink data.

In a third processing method, although uplink grant signaling which schedules this SHARQ process is before the timing of the subframe in which the PHICH exists, if there is still enough processing time between the previous uplink transmission of this SHARQ process and the uplink grant signaling for the base station to decode uplink data, then the UE still deems that the base station has completed decoding of the previous data transmission of the SHARQ process before the base station sends the uplink grant signaling, and then knows whether the previous uplink transmission is successful or has failed. Thus, the UE can obtain parameters of transmitting uplink data in the uplink subframe according to the uplink grant signaling. On the contrary, if there is not enough processing time between the previous uplink transmission of this SHARQ process and the uplink grant signaling for the base station to decode uplink data, and then does not know whether the previous uplink transmission is successful or has failed, thus, the UE needs to further receive PHICH information and determine whether the previous uplink transmission is successful or has failed according to the PHICH information.

For example, when determining whether the base station has time to complete decoding the previous uplink transmission of this SHARQ process in the third processing method, a t ms delay can be used as a threshold. If an interval between the previous uplink transmission of this SHARQ process and the uplink grant signaling is greater than or equal to t ms, then, deeming that the base station can know whether the previous uplink transmission is successful or has failed, the UE can obtain parameters of transmitting uplink data in the uplink subframe according to the uplink grant signaling, i.e., operating according to the above first processing method. Otherwise, deeming that the base station does not know whether the previous uplink transmission is successful or has failed, thus, the UE needs to further receive PHICH information and determine whether the previous uplink transmission is successful or has failed according to the PHICH information, i.e., operating according to the above second processing method.

In the existing LTE system, for a PUSCH sent in subframe n, the base station can send PHICH information of the same SHARQ or new uplink grant signaling in subframe n+4 at the earliest. In this way, the above parameter t of the present invention can be equal to 4. Thus, for the FDD system, the base station certainly does not have enough time for decoding. For the TDD system, since an interval from a PUSCH to a PHICH channel corresponding to the PUSCH is generally greater than 4 subframes, then, it is possible to send the uplink grant signal in a downlink subframe which is earlier than a PHICH subframe and the 4 ms delay can be met, so as to know whether the previous uplink transmission is successful or has failed. Or, considering that the processing capacity of the base station can be relatively strong, t can also be set to a value smaller than 4, such as 3. In this way, for FDD and TDD, the processing time of the base station on the uplink data is likely to be met.

3) if the UE does not detect uplink grant signaling which schedules a SHARQ process before a timing position of PUSCH retransmission of the SHARQ process, then the UE performs processing according to the PHICH information corresponding to this SHARQ process. For example, when the PHICH information is an ACK, the UE can report the ACK to the higher layer and stop uplink transmission; when the PHICH information is a NACK, the UE can report the NACK to the higher layer, and retransmit uplink data of the same SHARQ process under the precondition of not exceeding a maximum retransmission time.

4) if the UE does not detect uplink grant signaling which schedules a SHARQ process before a timing position of PUSCH retransmission of the SHARQ process, and there is no PHICH channel in a timing position of the PHICH of this SHARQ process, the UE can report the ACK to the higher layer and stop uplink transmission. Here, the reason why there is no PHICH channel may be that a subframe in which a timing of the PHICH exists is an uplink subframe; or, because a reference UL-DL configuration different from an SIB1 UL-DL configuration is used to process timing of uplink transmission, although what is found in the timing position of the PHICH according to the reference UL-DL configuration is still a downlink subframe, but the downlink subframe is in an SIB1 UL-DL configuration and is not allocated with the PHICH channel.

5) if the UE detects uplink grant signaling which schedules a same SHARQ process in multiple downlink subframes, then the UE can deem this is an illegal situation, or the UE can also perform uplink transmission in a corresponding uplink subframe according to one of them, for example, the latest uplink grant signaling.

A legal situation in which the UE detects uplink grant signaling which schedules a same SHARQ process in multiple downlink subframes can be: before the base station determines whether a previous uplink transmission of one SHARQ process is successful or has failed, the base station sends an uplink grant signaling which schedules the SHARQ process to the UE so as to trigger the UE to perform adaptive retransmission by sending a PHICH NACK in a subsequent downlink subframe. After sending the uplink grant signaling, the base station completes demodulation of the previous PUSCH transmission. If the demodulation is not successful, the base station sends a NACK to the UE through the PHICH, and the UE still performs data retransmission according to the aforementioned uplink grant signaling. If the demodulation is successful, the base station may desire to send new uplink data in this SHARQ process. At this time, the base station can send another new uplink grant signaling aiming at the same SHARQ process, and indicates the UE to perform new data transmission through modification of the NDI. At this time, the situation in which the UE detects uplink grant signaling which schedules a same SHARQ process in multiple downlink subframes will appear.

In step 203 according to the processing of step 202, the UE sends new uplink data, retransmits data of the SHARQ process to which the uplink subframe belongs, or currently does not send uplink data in the uplink subframe.

At this point, the method of the present invention ends. Corresponding to the above method, the present invention also provides a UE device for transmitting HARQ for uplink data in support of multi-subframe scheduling.

Figure 3:
FIG. 3 is a schematic diagram of a user device according to an embodiment of the present invention.

FIG. 3 is a schematic diagram of the user device. As shown in FIG. 3, the UE device includes a data receiving unit, a processing unit and a data sending unit.

The data receiving unit is configured to receive a multi-subframe scheduling uplink grant signaling and PHICH information sent from a base station. The processing unit is configured to, according to a timing relationship between the multi-subframe scheduling uplink grant signaling and a scheduled uplink subframe, determine a timing position of a subsequent transmission of the scheduled uplink subframe and its corresponding SHARQ process. For the scheduled uplink subframe, based on the above method of the present invention, the UE determines parameters of uplink transmission according to the uplink grant signaling which schedules the SHARQ process of the scheduled uplink subframe and the relative position of the PHICH channel. The data sending unit is configured to perform data transmission or stop current transmission in the uplink subframe according to the parameters of uplink transmission determined by the processing unit.

It can be seen from the above implementations of the present invention, adopting the method and device of the present invention, the complexity of standardization work can be reduced. When a new UE supporting multi-subframe scheduling and an existing UE not supporting multi-subframe scheduling simultaneously exist in a cell, the complexity of a scheduler can be reduced.

The foregoing description provides embodiments of the present invention and is not for use in limiting the protection scope thereof. All modifications, equivalent replacements or improvements in accordance with the spirit and principles of the present invention shall be included in the scope of the present invention, as defined by the appended claims.

What is claimed is:

1. A method for transmitting hybrid automatic repeat request (HARQ) for uplink data in support of multi-subframe scheduling in a user equipment (UE), the method comprising:
   receiving, from a base station, information on a physical HARQ indicator channel (PHICH) and a multi-subframe scheduling uplink grant signaling, respectively;
   determining timing positions of a scheduled uplink subframe and a subsequent physical uplink shared control channel (PUSCH) transmission of a synchronous HARQ (SHARQ) process of the scheduled uplink subframe, according to a timing relationship between the multi-subframe scheduling uplink grant signaling and the scheduled uplink subframe; and
   for the scheduled uplink subframe, determining parameters of a subsequent uplink transmission according to the multi-subframe uplink grant signaling which schedules the SHARQ process of the scheduled uplink subframe and a relative transmission position of the PHICH, and performing data transmission or stopping a current transmission in the scheduled uplink subframe according to the parameters,
   wherein the timing positions are determined based on a time-division duplexing (TDD) uplink-downlink (UL-DL) configuration transmitted in a system information block or a reference UL-DL configuration by high-layer signaling.

2. The method of claim 1, wherein determining a timing position of a subsequent transmission of a SHARQ process of the scheduled uplink subframe comprises:
determining the timing position of the subsequent uplink transmission of the SHARQ process by using a same method as that of a UE which does not support multi-subframe scheduling.

3. The method of claim 1, wherein the timing positions are further determined based on:
configuring one of 7 kinds of TDD UL-DL configurations as the reference UL-DL configuration by the high-layer signaling,
where timing of the scheduled uplink subframe and the subsequent PUSCH transmission of the SHARQ process of the scheduled uplink subframe are determined according to the reference UL-DL configuration.

4. The method of claim 3, wherein determining a timing position of a subsequent transmission of a SHARQ process of the scheduled uplink subframe comprises:
determining a PHICH timing relationship of one PUSCH transmission of the SHARQ process and a timing relationship of PUSCH retransmission triggered by the PHICH by using a same method as that of UE which does not support multi-subframe scheduling.

5. The method of claim 1, wherein in a TDD system, in the timing relationship between the multi-subframe scheduling uplink grant signaling and the scheduled uplink subframes, if the multi-subframe scheduling uplink grant signaling carried in one downlink subframe n is configured to schedule uplink data transmission of at most M uplink subframes, the M uplink subframes comprises one or two subframes scheduled by the downlink subframe n in LTE version 8 system.

6. The method of claim 5, wherein the timing relationship between the multi-subframe scheduling uplink grant signaling and the scheduled uplink subframes comprising a timing relationship from the multi-subframe scheduling uplink grant signaling to the uplink subframe scheduled by the multi-subframe scheduling uplink grant signaling is unified set for all TDD UL-DL configurations; or a timing relationship from the multi-subframe scheduling uplink grant signaling to an actually existing uplink subframe scheduled by the multi-subframe scheduling uplink grant signaling is set for each TDD UL-DL configuration, respectively.

7. The method of claim 6, wherein when timing relationship is the unified setting timing relationship from the multi-subframe scheduling uplink grant signaling to the uplink subframes scheduled by the multi-subframe scheduling uplink grant signaling for all TDD UL-DL configurations, the multi-subframe scheduling uplink grant signaling in the timing relationship is sent only in some of downlink subframes, or, the multi-subframe scheduling uplink grant signaling in the timing relationship is sent in all downlink subframes.

8. The method of claim 5, wherein in the timing relationship between the multi-subframe scheduling uplink grant signaling and the scheduled uplink subframes, allowing one multi-subframe scheduling uplink grant signaling to scheduling multiple transmissions of a same SHARQ process.

9. The method of claim 1, wherein determining parameters of uplink transmission comprises: when an uplink grant signaling which schedules one SHARQ process is detected in a timing of a downlink subframe in which the PHICH of the SHARQ process exists or a timing of a subsequent subframe, determining parameters of uplink transmission in the scheduled uplink subframe according to the uplink grant signaling which schedules the SHARQ process.

10. The method of claim 1, wherein determining parameters of uplink transmission comprises, when the multi-subframe uplink grant signaling which schedules one SHARQ process is detected in a timing of a subframe before a timing of a downlink subframe in which the PHICH of the SHARQ process exists, determining parameters of uplink transmission in the scheduled uplink subframe according to the uplink grant signaling which schedules the SHARQ process.

11. The method of claim 1, wherein determining parameters of uplink transmission comprises, when the multi-subframe uplink grant signaling which schedules one SHARQ process is detected in a timing of a subframe before a timing of a downlink subframe in which the PHICH of the SHARQ process exists, determining whether a previous uplink transmission is successful or has failed according to the information on the PHICH and determining resource configuration of the scheduled uplink subframe according to the multi-subframe uplink grant signaling which schedules the SHARQ process.

12. The method of claim 11, wherein performing data transmission or stopping the current transmission in the scheduled uplink subframe comprises:
when determining that the previous uplink transmission is successful according to the information on the PHICH, stopping data transmission in the scheduled uplink subframe; and
when determining the previous uplink transmission has failed according to the information on the PHICH, performing data retransmission in the scheduled uplink subframe according to the determined resource configuration.

13. The method of claim 11, wherein performing data transmission or stopping the current transmission in the scheduled uplink subframe comprises:
when determining the previous uplink transmission is successful according to the information on the PHICH, transmitting new data in the scheduled uplink subframe according to the determined resource configuration; and
when determining the previous uplink transmission has failed according to the information on the PHICH, performing data retransmission in the scheduled uplink subframe according to the determined resource configuration.

14. The method of claim 11, wherein the performing data transmission or stopping the current transmission in the scheduled uplink subframe comprises:
according to the information on the PHICH and new data indicator (NDI) of uplink grant signaling, jointly indicating transmitting new data or retransmitting data for one SHARQ process.

15. The method of claim 1, wherein determining parameters of uplink transmission comprises:
when the multi-subframe uplink grant signaling which schedules one SHARQ process is detected in a timing of a subframe before a timing of a downlink subframe in which the PHICH of the SHARQ process exists, if an interval between a previous uplink transmission of the SHARQ process and the uplink grant signaling is greater than or equal to a predetermined t ms, determining parameters of uplink transmission in the scheduled uplink subframe according to the uplink grant signaling; and
otherwise, determining whether the previous uplink transmission is successful or has failed according to the information on the PHICH and determining resource configuration of the scheduled uplink subframe according to the multi-subframe uplink grant signaling which schedules the SHARQ process.

16. The method of claim 1, wherein if the UE does not detect the multi-subframe uplink grant signaling which schedules the SHARQ process, the UE performs processing according to the information on the PHICH corresponding to the SHARQ process.

17. The method of claim 1, further comprising:
if the UE does not detect the multi-subframe uplink grant signaling which schedules one SHARQ process before a retransmission timing of the SHARQ process and there is no PHICH in a timing position of the PHICH of the SHARQ process, reporting an ACK to a higher layer and stopping uplink transmission.

18. The method of claim 1, further comprising:
if the UE detects the multi-subframe uplink grant signaling which schedules a same SHARQ process in multiple downlink subframes, performing uplink transmission in a corresponding uplink subframe according to a latest uplink grant signaling.

19. A user equipment (UE) device for transmitting hybrid automatic repeat request (HARQ) for uplink data in support of multi-subframe scheduling, the UE device comprising:
a transceiver configured to transmit or receive data; and
a controller configured to:
receive, from a base station, information on a physical HARQ indicator channel (PHICH) and a multi-subframe scheduling uplink grant signaling, respectively;
determine timing positions of the scheduled uplink subframe and a subsequent physical uplink shared control channel (PUSCH) transmission of a synchronous HARQ (SHARQ) process corresponding to the scheduled uplink subframe, according to a timing relationship between the multi-subframe scheduling uplink grant signaling and the scheduled uplink subframe;
for the scheduled uplink subframe, determine parameters of a subsequent uplink transmission according to the multi-subframe uplink grant signaling which schedules the SHARQ process of the scheduled uplink subframe and a relative transmission position of the PHICH; and
perform data transmission or stop a current transmission in the scheduled uplink subframe according to the parameters,
wherein the timing positions are determined based on a time-division duplexing (TDD) uplink-downlink (UL-DL) configuration transmitted in a system information block 1 or a reference UL-DL configuration by high-layer signaling.

20. The UE device of claim 19, wherein the timing positions are further determined based on configuring one of 7 kinds of TDD UL-DL configurations as the reference UL-DL configuration by the high-layer signaling,
where timing of the scheduled uplink subframe and the subsequent PUSCH transmission of the SHARQ process of the scheduled uplink subframe are determined according to the reference UL-DL configuration.

* * * * *